Patented Oct. 31, 1944

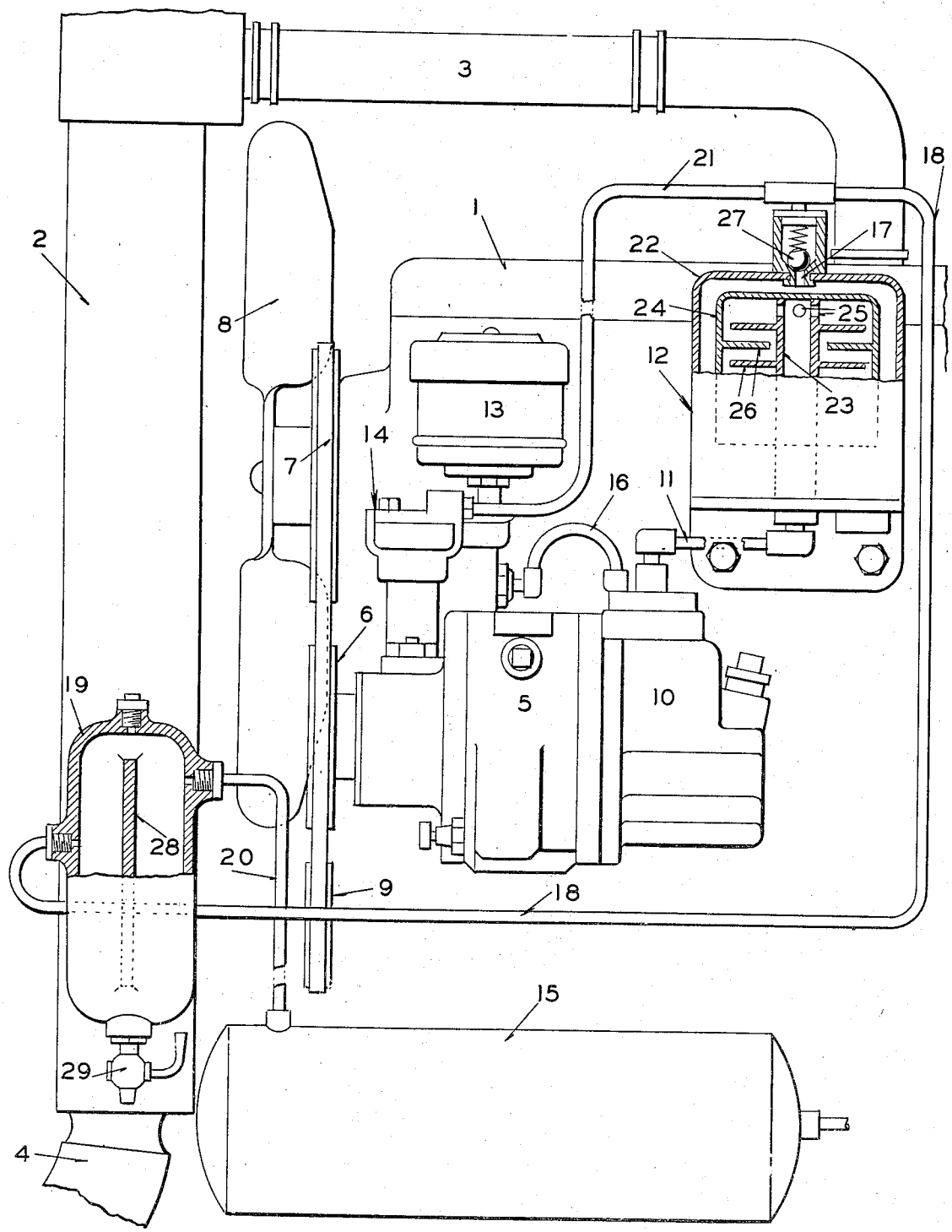

2,361,393

UNITED STATES PATENT OFFICE 2,361,393

OIL AND WATER SEPARATING SYSTEM FOR ASSOCIATION WITH AIR COMPRESSORS

Walter R. Freeman, Clayton, and Cyril B. Fites, St. Johns, Mo., assignors to Wagner Electric Corporation, St. Louis, Mo., a corporation of Delaware Application November 26, 1941, Serial No. 420,497

2 Claims. (Cl. 183—32)

In fluid pressure systems embodying an air compressor there is associated therewith an oiling system for the moving parts of the compressor. Some of the oil which lubricates these parts becomes mixed with the compressed air and is discharged therewith. In addition to the oil in the compressed air, there is also water vapor since the air to be compressed is drawn directly from the atmosphere. If the oil is not removed from the compressed air and returned to the oil reservoir, there will be unnecessary waste. Also, if the oil and water are not both removed from the compressed air before it is used in an air pressure-actuated system, the water and oil become mixed and form a congealed mass which will block the conduits and also prevent proper operation of the parts actuated by the air pressure.

One of the objects of our invention is to provide improved means for separating oil and water vapor from compressed air.

Another object of our invention is to provide means for separating oil and water vapor from compressed air which will cause the oil to be separated independently of the water and thereby allow its re-use for lubricating purposes.

Still another object of our invention is to so associate separators with an air compressor discharge outlet and so subject them to such temperatures that when the compressed air discharged by the compressor and carrying oil and water vapor is caused to pass through said separators in series, the oil will first be extracted and then a substantial amount of the water vapor.

A more specific object of our invention is to produce separating means for extracting oil and water from compressed air which can be efficiently employed with an air compressor associated with and driven by the engine of a motor vehicle.

Other objects of our invention will become apparent from the following description taken in connection with the accompanying drawing in which the single figure is a view, partly in section, showing a portion of a vehicle engine with which is associated therewith an air pressure system comprising an air compressor and separators so positioned as to separately remove oil and water from the compressed air, all in accordance with our invention.

Referring to the figure in detail, there is shown a portion of the internal combustion engine 1 of the vehicle which has associated therewith the usual water cooling system comprising a radiator 2 connected at its upper and lower ends with the water jacket of the engine by conduits 3 and 4. Mounted along side the forward end of the engine is a compressor 5 of the rotary type, the drive shaft of which carries a pulley 6 which is driven by the belt 7 employed to drive the fan 8 mounted on the forward end of the engine, said fan belt being driven by the pulley 9 on the crankshaft of the engine. The compressor 5 has associated therewith an oil dome or reservoir 10 into the top of which the compressed air from the compressor is discharged and from where it is conducted by a pipe 11 to a separator 12.

The air to be compressed by the compressor is taken into the compressor through the air cleaner 13 and associated with the compressor between said air cleaner and the inlet of the compressor is a combined unloading and venting valve means 14 which is employed to shut off the inlet and simultaneously vent the top of the oil reservoir 10 to atmosphere whenever the compressor has operated sufficiently to place air in air tank 15 under a predetermined pressure. The valve means 14 is connected with the top of the reservoir by a conduit 16 in order that said reservoir may be vented to atmosphere through the valve means. The rotary compressor and valve means 14 are of well-known construction and the details thereof need not be described.

The separator 12 is provided with an outlet 17 which is connected by a conduit 18 to a second separator 19, which separator is in turn connected to tank 15 by a conduit 20. In order that the valve means 14 can be operated when the fluid pressure in the air tank 15 reaches a predetermined value, a conduit 21 is connected between conduit 18 and the valve means.

The separator 12 is for separating oil and comprises a housing 22 into which extends a pipe 23, said pipe being in communication with conduit 11 coming from the compressor. Positioned on the inner end of the pipe is an inverted cup-shaped member 24 and the pipe communicates therewith through openings 25. Between the closed and open ends of the cup-shaped member are baffles 26 so arranged that the fluid coming from the compressor must pass back and forth through the spaces between the baffles. By causing the compressed fluid to pass through the baffles of the separator in the manner described, oil which is carried by the compressed air will collect upon the baffles and eventually run down into the bottom of the separator. The compressed air which has had the oil removed therefrom can then pass out through outlet 17 of the separator into conduit 18. A check valve 27 is associated with the outlet to prevent compressed air from flowing back into the separator, this being necessary because if this valve were not present, compressed air would escape back into the oil reservoir and out to atmosphere through conduit 16 whenever the reservoir was vented to atmosphere at the time of unloading of the compressor. The oil can be returned to the reservoir from the separator through conduit 11 at the time the compressor is unloaded. This can be accomplished, if desired, by a suitable automatically-opened valve as, for example, that shown in our copending application for Oil economizing system for compressors, Serial No. 417,602, filed November 3, 1941.

The separator 19 is for separating water and comprises an elongated chamber which is divided by a baffle 28, said baffle being spaced from the ends of the chamber of the separator so as to permit the air to pass around said baffle. A conduit 20 conducts the compressed air to tank 15. The lower end of the chamber is provided with a petcock 29 whereby water which is caused to collect in the bottom thereof may be drained.

The arrangement of the separator 12, which, as previously noted, has for its purpose the extracting of oil from the compressed air, and the separator 19, which, as also previously noted, has for its purpose the extracting of water from the compressed air, and the temperatures to which they are subjected are very important features of our invention. The oil separator 12 must be the first separator in the line of flow of compressed air from the compressor in order that independent separation of the oil and water will take place.

In order to obtain an efficient separation of the oil without simultaneously separating any water, separator 12 must be subjected to a temperature which is at least above 130 degrees Fahrenheit. This desired temperature can be obtained by mounting the separator 12 along side the internal combustion engine of the vehicle. The temperature at which the engine generally operates is around 170 to 180 degrees Fahrenheit. Thus, with separator 12 positioned along side the engine, the temperature to which it will be subjected will be maintained someplace above 130 degrees Fahrenheit. When a separator such as shown at 12 is subjected to the specified temperature, it will extract substantially all of the oil from the discharged compressed air and at the same time will not cause any condensation of the water vapor which is carried by the compressed air. If the temperature should be below 130 degrees, then separator 12 will be cool enough so that some water will be condensed which, of course, is not desirable when the separated oil is to be returned to the reservoir 10 for reuse in lubricating the compressor.

The air under atmospheric pressure which is sucked into the compressor to be compressed will be raised in temperature a considerable amount above the atmospheric temperature simultaneously with it being compressed. This rise in temperature is so great that the increase in pressure will have no effect in causing any water to be dropped from the air during the compressing operation. In the particular rotary compressor shown the temperature of the compressed air when it leaves the oil dome and enters conduit 11 is substantially 225 degrees Fahrenheit. Thus it is seen that even if the relative humidity of the air which is taken into the compressor is 100 per cent, the increase in the temperature during the compressing operation will cause the relative humidity to drop to quite a low figure, notwithstanding the fact that the pressure has been increased. When the compressed air at 225 degrees Fahrenheit temperature enters the separator 12, which will be above 130 degrees, only the oil which is carried in the compressed air in the form of small particles and fine mist will collect upon the baffles and be extracted from the compressed air before it passes into conduit 18. There will be insufficient fall in temperature to cause the water vapor to condense.

After the oil is extracted from the compressed air by separator 12, the compressed air will pass through conduit 18 to separator 19 and in entering the separator chamber will strike against baffle 28. This separator 19, in order to properly extract as much water as possible from the compressed air, must be situated so that it is subject to a temperature of less than 100 degrees Fahrenheit, preferably considerably below this figure. The temperature, however, should not be below 32 degrees Fahrenheit in order to prevent the water collecting in the bottom of the separator from becoming frozen and thereby causing damage to the separator. Of course, ideal conditions would be to have this separator subjected to a temperature which is just above freezing. However, this is not practical due to excessive cost and, therefore, a compromise temperature must be employed. We have found for all practical purposes that if separator 19 is positioned along side radiator 2, efficient results will be obtained in the extracting of the water from the compressed air. The separator must be in the air stream which is coming through the grill of the vehicle and not behind the radiator for then it will be subjected to too much heat from the radiator and thus not be maintained at a low enough temperature. When the separator is positioned as shown, it receives sufficient heat from the radiator so that in winter operation of the vehicle it will not be subjected to freezing temperatures. In summer operation the air stream passing around the separator will keep it sufficiently cool so that satisfactory results will be obtained.

Thus, with the separator 19 subjected to a temperature below 100 degrees and above freezing, compressed air entering the separator will have extracted therefrom a certain amount of the water which will collect in the bottom of the separator and may be removed from time to time by opening the petcock. Although the temperature to which this separator 19 is subjected varies somewhat in winter and summer operations, it will probably always be somewhere between 40 and 70 degrees Fahrenheit. This will cause the extraction of a considerable amount of water, especially if the relative humidity of the air which is drawn into the compressor is quite high. It is possible that no water may be extracted by separator 19 if the relative humidity of the air entering the compressor is very low as the drop in temperature of the compressed air, when passing through separator 19, will be insufficient to cause any water to be removed. Tests have shown, however, that satisfactory results are obtained by separator 19 and that water extracted thereby is sufficient to prevent any great accumulation of water in the air tank and also in the actuating system which is operated by air pressure from the tank.

By removing substantially all of the oil from the compressed air of the compressor and all the water possible by passing the compressed air through a separator, the temperature of which is say around 40 or 50 degrees Fahrenheit, under most conditions it is possible to obtain satisfactory dry air free from oil and thus eliminate any probability of oil and water becoming mixed and forming congealed masses which will block the conduits and prevent proper operation of the moving parts of the actuating system. Of course, when the temperature of the atmosphere is lower than that to which the separator 19 is subjected, some additional water may condense in the air tank 15 if the tank is exposed to atmosphere and not mounted in a compartment of the vehicle having a higher temperature than the atmosphere. However, by devising a system in which most of the water can be extracted from the compressed air during most of the operating conditions, a practical system will result which will not permit the undesirable conditions caused by mixing the oil and water to arise.

Although we have shown, by way of example, our invention embodied in an air compressor system associated with a motor vehicle wherein the compressor is driven by the engine of the vehicle, it is to be understood that it may be embodied in any compressor system. Therefore, being aware of the possibility of modifications in the particular structure herein described without departing from the fundamental principles of our invention, we do not intend that its scope be limited except as set forth by the appended claims.

Having fully described our invention, what we claim as new and desire to secure by Letters Patent of the United States is:

1. In an air pressure system for use on a vehicle propelled with an internal combustion engine, said system comprising a compressor driven by the engine and which discharges compressed air carrying oil and water vapor, a compressed air receiver, conduit means for conducting compressed air from the compressor to the receiver, two separators interposed in series in said conduit means and through which the compressed air must pass, the first of said separators in the line or flow of the compressed air being so positioned adjacent the engine of the vehicle that it will be subject to such heat from the engine when operating that it will be of a temperature permitting said separator to extract the oil from the compressed air but not of such lower temperature as to cause water also to be extracted by said separator, and the second separator being so positioned that it will be subject to such a lower temperature than that of the first separator that water vapor will be condensed from the compressed air but not such a lower temperature as to be below freezing when the engine is running and the vehicle moving.

2. In an air pressure system for use on a vehicle provided with an internal combustion engine provided with a water cooling system having a radiator, said system comprising a compressor driven by the engine which discharges compressed air carrying oil and water vapor, a compressed air receiver, conduit means for conducting compressed air from the compressor to the receiver, two separators interposed in series in said conduit means and through which the compressed air must pass, the first of said separators in the line of flow of the compressed air being so positioned adjacent the engine of the vehicle that it will be subject to such heat from the engine when operating that it will have a temperature above 130 degrees Fahrenheit, and the second separator being so positioned adjacent the radiator of the engine cooling system but subject to an air stream at atmospheric temperature that it will have a temperature below 100 degrees Fahrenheit and above freezing.

WALTER R. FREEMAN.
CYRIL B. FITES.